Patented Aug. 22, 1950

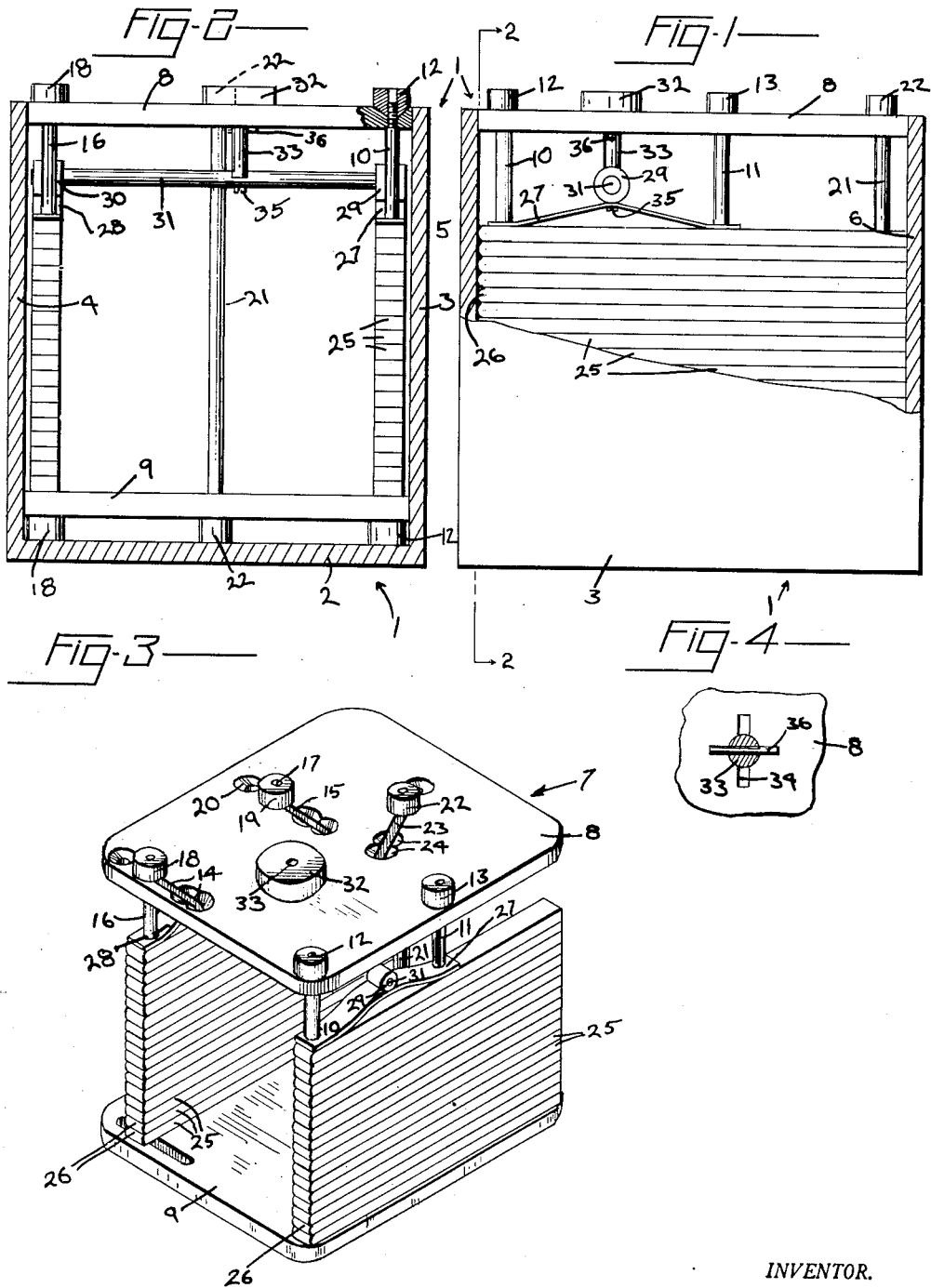

2,519,682

UNITED STATES PATENT OFFICE 2,519,682

RACK FOR PROCESSING TANKS

Robert J. Magill, Sausalito, Calif.

Application April 5, 1946, Serial No. 659,677

5 Claims. (Cl. 211—120)

This invention relates to a processing device and more particularly to a mechanism for processing cut film and the like.

In the past, many types of tanks and holders have been developed for use in the processing of cut film. These have ordinarily taken the form of ordinary tanks or tubs into which frames or holders for clamping the film have been supported. In general these devices have utilized clamps and/or wire frames to support the film but considerable difficulty has been encountered because the film is not held against curling or buckling nor against contact with other pieces of film. This has led to improper and non-uniform processing of film and also has made the film difficult to handle.

In addition, the devices presently in use are not arranged to support films of different sizes and different sized frames are ordinarily required. This leads to unnecessary equipment and expense which are not required in the use of the present invention which provides a rack in which the cut film may be secured along two parallel edges in order that it is maintained in a single plane.

Another object of the invention is a rack for holding cut film during processing which may be placed in any type of tank and which supports the various pieces of film in separate planes.

A further object of the invention is a rack for supporting film during its processing which is adapted to hold a plurality of pieces of film and may be transferred from tank to tank or solution to solution.

Still another object of the invention is a rack for supporting cut film during processing whose supporting members are adjustable for various sized pieces of film.

A still further object of the invention is a processing tank for cut film which comprises a rack for supporting a plurality of pieces of cut film in separate planes.

Yet another object of the invention is a processing tank for cut film comprising a rack arranged so that only a minimum amount of processing fluid need be used.

In the drawings:

Fig. 1 is a side elevation of one form of the invention, partially cut away to illustrate its construction.

Fig. 2 is a sectional view of the invention along the lines 2—2 of Fig. 1.

Fig. 3 is a perspective view of the rack shown in Figs. 1, 2 and which may also be used in any other form of tank.

Fig. 4 is a partial view of one of the end members of the rack with the adjustment knob removed to show the construction of the locking mechanism.

It is to be clearly understood that the form of the invention shown in the drawings is a preferred form only and that other applications will be obvious to those skilled in the art. It is also to be noted that the rack may be used with any sized tank, although a form of tank as illustrated in Figs. 1, 2 is preferred. It should be further noted that the particular form illustrated has been designed for processing cut film or the like but that it is capable of other uses.

The form of the invention illustrated in the drawings comprises a tank, generally designated 1, formed of metal or plastic material resistant to reaction to photographic chemicals. The tank may be of any convenient size or shape, but the one illustrated is approximately square. It is provided with a bottom 2, end walls 3, 4 and side walls 5, 6 but is open at the top to receive the rack or holder to be described.

The rack or holder for the cut film, shown in the tank in Figs. 1, 2 and in perspective in Fig. 3 is generally designated 7. It comprises a pair of similarly formed end plates 8, 9 one of which, as will be described, is, with one exception, the mirror image of the other. These end plates are also formed of some non-corrosive metal such as Monel or stainless steel, or plastic material suitable for use with photographic chemicals. The end plates are drilled with a pair of correspondingly positioned holes along one of their edges as shown in Figs. 1, 3 and these are adapted to receive the ends of a pair of stationary guide posts 10, 11. One of the guide posts 10 is located near one of the corners and the other post 11 is positioned at a point approximately ⅔ of the length of the side of the end plate from the first post. Each of the posts is formed with a threaded end section of reduced diameter, as can be seen in Fig. 2, and this provides a shoulder against which the end plate rests. The holes in the end plates are countersunk on their outer faces, as may be seen in the same figure, and are adapted to receive knurled knobs 12, 12 and 13, 13, which are internally threaded and adapted to receive the threaded ends of the posts 10, 11, respectively to secure them in position. These knobs are provided with tapered extensions to adapt their receipt in the countersunk holes in the end plates.

The end plates are also provided with a pair of slots, as at 14, 15, positioned near the opposite edges of the plates and extending in a direction toward the holes which receive posts 10, 11. These slots are adapted to receive a second pair of adjustable posts 16, 17, identical with posts 10, 11, and are arranged to be made secure by identical knobs 18, 18 and 19, 19, respectively. The slots are further countersunk with a series of recesses, as at 20, to receive the tapered knobs 18, 18, 19, 19, at pre-set positions to be explained.

In addition to the four posts just described, a fifth stop guide post 21, identical with the others, is adapted to be served between the plates by similar knobs 22, 22 at a point to the side of but approximately midway between posts 10, 16 and between posts 11, 17. This post is received in slots, as at 23, similar to the slots as at 14, 15, but these additional slots are adapted to extend angularly with respect to said other slots. They likewise are provided with recessed positions as at 24, to receive tapered knobs 22, 22.

Posts 10, 11 are adapted to receive a series of film supports 25, as can be seen in Fig. 3. These supports are relatively long rectangular blocks of non-corrosive material, such as a plastic, and each is drilled with a pair of holes correspondingly positioned to receive the posts 10, 11. Each support is rounded at one of its ends as at 26 to facilitate the insertion of a piece of cut film between it and an adjacent support. A similar series of supports is also positioned in place by posts 16, 17 in an identical manner and parallel to the first group.

The two series of supports 25 are slidably mounted on the posts in a manner that they may be moved along the posts singly or in groups as desired. In order that the support will be enabled to support cut film a pair of flat springs 27, 28 which may be formed of Monel or stainless steel, are provided. These springs are formed with two legs, the ends of which are drilled with slightly extended holes to receive the posts. One spring is mounted to receive posts 10, 11 and the other receives posts 16, 17. The springs are conveniently secured to a pair of sleeves 29, 30, respectively, and the sleeves are, in turn supported on a shaft 31 extending at right angles to the supports 25. The sleeve 30 is arranged and adapted to slide along shaft 31.

A positioning dial 32 is secured to the end of a short shaft 33 which extends through a hole, as at 34, in the end plate 8. The other end of shaft 33 is rotatably secured, by means of a screw 35, to shaft 31 which supports springs 27, 28. The hole at 34 in end plate 8, is formed in such a manner, as can be seen in Fig. 4, that a small pin 36, mounted in shaft 33 at a distance corresponding to the thickness of plate 8 from dial 32 is permitted to pass through end plate 8 when the shaft is properly angularly positioned by knob 32 but is prevented from such passage and retained on the inner side of end plate 8 opposite dial 32 in normal use. In this position, the springs 27, 28 are forced against the two stacks of supports 25 to urge them together in order that pieces of film may be supported between adjacent ones in the stack.

As has been described, the slots 14, 15 and 23 are countersunk at various predetermined points. This is done to permit the rapid setting of the film supports for particular and standard sizes of cut film. Such film is practically always used in these standard sizes and, as a consequence, the distance between the two stocks of film supports must be set to correspond to one of the dimensions of the film to be processed. The film may be satisfactorily supported along its edges by $\frac{1}{16}''$ to $\frac{1}{8}''$ if it is held between the adjacent supports 25 and the recesses in slots 14, 15 are so positioned that when the posts 16, 17 are secured by means of the tapered knobs at two corresponding recessed points, the two stacks of supports 25 will be properly spaced to receive a standard size film. In addition, stop post 21, which serves as a guide when the film is inserted between the supports 25, may also be served by knobs 22 at one pair of the recesses 24 in slots 23. This insures that the particular standard sized film is properly positioned with respect to its other dimension. The slots at 23 are positioned at an angle with respect the slots 14, 15 in order that the guide post 21, when positioned properly for the dimension extending between the stacks of supports, is approximately midway between said supports, regardless of the size film being processed.

In operation, the invention is extremely easy to use. The rack or holder 7 may be taken as a unit and the tapered knobs 19, 18, 22 loosened to permit the setting of posts 16, 17, 21 in the proper positions to receive the film. If standard sized film is to be processed, the knobs are set into the proper recesses, but if irregularly sized film is to be used, any convenient position is taken. The knobs are tightened to secure the posts and dial 32 is turned until pin 36 is withdrawn through the opening at 34 in end plate 8 and the springs 27, 28 release the film support 25. Any desired number of pieces of cut film are then positioned between the respective supports by sliding them in between posts 10, 16 until they are stopped by post 21. When the film has been positioned, the springs 27, 28 are reset by means of dial 32 and locked in place by turning the dial until pin 36 locks on the opposite side of end plate 8.

The whole rack 7 may then be positioned in the tank 1 which has either been filled with the processing fluid or may yet be filled. The use of a tank like the one shown in Figs. 1, 2 is not required with the invention, as any tank of suitable size may be used. Also the rack may be placed in the tank in any position, in its ends or sides, although the positioning indicated in Figs. 1, 2 permits a small number of pieces of film to be processed, if these are placed between the lower supports without filling the tank completely full.

When the processing is completed, the rack may be removed from the tank and inserted in the next processing or washing tank, or, the tank may be emptied and refilled with another fluid. When the processing is completed the rack, still containing the film, may be placed in some convenient place where the film may be dried.

It is thus seen that the invention permits the processing of large numbers of pieces of film as a single unit and it is not necessary to handle each piece separately each time it is to be moved. Nor is it necessary to adjust large numbers of individual holders, as the single adjustment of the movable guide posts is sufficient.

The film being held tightly along two of its parallel edges is prevented from buckling or bending thus is flat and smooth when the processing is completed. Additionally, the positioning of the separate pieces in separate planes prevent their interfering with or touching one another and also permits a free flow of the processing fluid to all parts of each piece of film, thus insuring uniform action of the chemicals at all points on the surface.

I claim:

1. A rack for processing sheets comprising: a pair of end members, each of said members having a pair of parallel and correspondingly positioned slots formed therein; a pair of parallel stationary guides extending between said end members; a plurality of supports slidably supported on said stationary guides; a pair of parallel movable guides extending between said members and having their ends positioned in said slots; means secured to said movable guides for securing said guides at various positions along said slots and at varying distances from said stationary guides; a plurality of corresponding supports slidably supported on said movably guides, said pluralities of supports being adapted to frictionally engage and support sheets of material to be processed between adjacent ones of said supports and between said pairs of guides; a spring secured between the guides of one of said pairs and in engagement with the end one of the corresponding plurality of supports for urging the supports in said one of said pluralities of supports together.

2. A rack for processing sheets comprising: a pair of end members, each of said members having a pair of parallel and correspondingly positioned slots formed therein; a pair of parallel stationary guides extending between said end members; a plurality of supports slidably supported on said stationary guides; a pair of parallel movable guides extending between said members and having their ends positioned in said slots; means secured to said movable guides for securing said guides at various positions along said slots and at varying distances from said stationary guides; a plurality of corresponding supports slidably supported on said movable guides; said pluralities of supports being adapted to frictionally engage and support sheets of material to be processed between adjacent ones of said supports and between said pairs of guides; a spring secured between the guides of one of said pairs and in engagement with the end one of the corresponding plurality of supports for urging the supports in said one of said pluralities of supports together; a guide extending between said end members positioned in a plane parallel to and lying between the planes in which the said pairs of guides lie.

3. A rack for processing sheets comprising: a pair of end members, each of said members having a pair of parallel and correspondingly positioned slots formed therein; a pair of parallel stationary guides extending between said end members; a plurality of supports slidably supported on said stationary guides; a pair of parallel movable guides extending between said members and having their ends positioned in said slots; means secured to said movable guides for securing said guides at various positions along said slots and at varying distances from said stationary guides; a plurality of corresponding supports slidably supported on said movable guides; said pluralities of supports being adapted to frictionally engage and support sheets of material to be processed between adjacent ones of said supports and between said pairs of guides; a spring secured between the guides of one of said pairs and in engagement with the end one of the corresponding plurality of supports, for urging the supports in said one of said pluralities of supports together; means secured to one of said end members for releasing said spring from engagement with said one of said supports.

4. A rack for processing sheets comprising: a pair of parallel end members, spaced from one another, each of said members having a pair of parallel and correspondingly positioned slots formed therein; a pair of stationary guides extending between said end member; a pair of parallel movable guides extending between said members and having their ends positioned in said slots; means secured to said movable guides for securing said guides at various positions along said slots and at various distances from said stationary guides; a plurality of supports slidably supported on and between the guides of each pair of guides, said pluralities of supports being arranged to frictionally engage and support sheets of material to be processed between adjacent ones of said supports and between said pairs of guides; a spring secured between the ones of each pair of guides and in engagement with the end of the corresponding plurality of supports for urging the supports in said pluralities of supports together.

5. A rack for processing sheets comprising: a pair of parallel end members, spaced from one another, each of said members having a pair of parallel and correspondingly positioned slots formed therein; a pair of parallel, movable guides extending between said members and having their ends positioned in said slots; a pair of parallel, stationary guides extending between said members; means secured to said movable guides for securing said guides at various positions along said slots and at various distances from said stationary guides; a plurality of supports slidably supported on and between the ones of each pair of guides, said pluralities of supports being arranged to frictionally engage and support sheets of material to be processed between adjacent ones of said supports and between said pairs of guides; a spring secured between the ones of each pair of guides and in engagement with the end of the corresponding plurality of supports for urging the supports in said pluralities of supports together; means secured to one of said end members for releasing said springs from engagement with the said supports.

ROBERT J. MAGILL.

REFERENCES CITED

The following references are of record in the file of this patent:

UNITED STATES PATENTS

| Number | Name | Date |
| --- | --- | --- |
| 495,102 | Reid | Apr. 11, 1893 |
| 574,879 | Chenery | Jan. 12, 1897 |
| 620,261 | Thorpe | Feb. 28, 1899 |
| 1,929,283 | Miller | Oct. 3, 1933 |
| 1,969,893 | Leahey | Aug. 14, 1934 |